(12) United States Patent
Bertrand et al.

(10) Patent No.: US 11,753,754 B2
(45) Date of Patent: Sep. 12, 2023

(54) MULTIAXIAL REINFORCING FABRIC WITH A STITCHING YARN FOR IMPROVED FABRIC INFUSION

(71) Applicant: Owens Corning Intellectual Capital, LLC, Toledo, OH (US)

(72) Inventors: Chloé Bertrand, La Motte Servolex (FR); Richard Veit, Rochefort (FR); Samuel Solarski, La Madeleine (FR)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 363 days.

(21) Appl. No.: 17/268,697

(22) PCT Filed: Aug. 16, 2019

(86) PCT No.: PCT/US2019/046751
§ 371 (c)(1),
(2) Date: Feb. 16, 2021

(87) PCT Pub. No.: WO2020/041107
PCT Pub. Date: Feb. 27, 2020

(65) Prior Publication Data
US 2021/0180225 A1 Jun. 17, 2021

Related U.S. Application Data

(60) Provisional application No. 62/720,418, filed on Aug. 21, 2018.

(51) Int. Cl.
*B32B 5/12* (2006.01)
*D04B 21/16* (2006.01)
(Continued)

(52) U.S. Cl.
CPC .......... *D04B 21/165* (2013.01); *D04H 3/115* (2013.01); *B32B 5/073* (2021.05); *B32B 5/12* (2013.01);
(Continued)

(58) Field of Classification Search
None
See application file for complete search history.

(56) References Cited

U.S. PATENT DOCUMENTS 5,795,835 A 8/1998 Bruner et al.
5,809,805 A 9/1998 Palmer et al.
(Continued)

FOREIGN PATENT DOCUMENTS

CN 201428038 Y 3/2010
CN 101516612 B 9/2012
(Continued)

OTHER PUBLICATIONS

Office Action from Chinese Application No. 201980054758.4 dated Apr. 8, 2022.
(Continued)

*Primary Examiner* — Alexander S Thomas
(74) *Attorney, Agent, or Firm* — Calfee, Halter & Griswold LLP

(57) ABSTRACT

Fabrics formed from a multitude of continuous fibers, each of the fibers including many individual filaments, are disclosed. The fibers are held together by a stitching yarn. Properties of the stitching yarn allow a resin to more readily flow through the fabric.

20 Claims, 15 Drawing Sheets

(51) Int. Cl.
*D04H 3/115* (2012.01)
*B32B 5/06* (2006.01)

(52) U.S. Cl.
CPC ...... *D10B 2101/06* (2013.01); *D10B 2101/12* (2013.01); *D10B 2403/02412* (2013.01); *D10B 2505/02* (2013.01)

(56) References Cited

U.S. PATENT DOCUMENTS

| | | | |
|---|---|---|---|
| 6,139,942 A | 10/2000 | Hartness et al. | |
| 6,599,610 B2 | 7/2003 | Homma et al. | |
| 7,168,272 B2 | 1/2007 | Dunn | |
| 7,431,980 B2 | 10/2008 | Woodman et al. | |
| 7,431,981 B2 | 10/2008 | Schneider | |
| 7,726,253 B2 | 6/2010 | Lilleheden et al. | |
| 7,758,313 B2 | 7/2010 | Eyb | |
| 7,930,907 B2 | 4/2011 | Dunn et al. | |
| 8,234,990 B2 | 8/2012 | Xie et al. | |
| 8,236,410 B2 | 8/2012 | Shinoda et al. | |
| 8,298,656 B2 | 10/2012 | Schneider | |
| 8,613,257 B2 | 12/2013 | Wockatz | |
| 9,273,418 B2 | 1/2016 | Arvidson et al. | |
| 9,346,943 B2 | 5/2016 | Hoppe | |
| 9,505,193 B2 | 11/2016 | Bergstrom | |
| 9,695,533 B2 | 7/2017 | Beraud et al. | |
| 9,770,844 B2 | 9/2017 | Moser et al. | |
| 9,993,992 B2 | 6/2018 | Whitledge et al. | |
| 10,022,907 B2 | 7/2018 | Bergstrom et al. | |
| 10,035,301 B2 | 7/2018 | Bergstrom et al. | |
| 10,167,583 B2 | 1/2019 | Witte et al. | |
| 10,850,453 B2 | 12/2020 | Koefoed et al. | |
| 2004/0113317 A1 | 6/2004 | Healey et al. | |
| 2010/0028644 A1 | 2/2010 | Xie et al. | |
| 2011/0293881 A1 | 12/2011 | Gojny et al. | |
| 2013/0280476 A1 | 10/2013 | Davis et al. | |
| 2014/0147620 A1 | 5/2014 | Li et al. | |
| 2015/0004368 A1 | 1/2015 | Witzke et al. | |
| 2015/0030804 A1 | 1/2015 | Baser | |
| 2016/0032519 A1 | 2/2016 | Li et al. | |
| 2017/0067191 A1 | 3/2017 | Gault et al. | |
| 2018/0001594 A1 | 1/2018 | Baser | |
| 2018/0010270 A1 | 1/2018 | Tan et al. | |
| 2018/0272626 A1 | 9/2018 | Wockatz et al. | |
| 2018/0272654 A1 | 9/2018 | Baser | |
| 2018/0281343 A1 | 10/2018 | Harada et al. | |
| 2018/0363178 A1 | 12/2018 | Koizumi | |
| 2019/0240953 A1 | 8/2019 | Kuroda | |
| 2019/0256673 A1 | 8/2019 | Geli et al. | |
| 2020/0002861 A1 | 1/2020 | de Rovere et al. | |
| 2020/0048804 A1 | 2/2020 | Ferrari | |
| 2020/0071865 A1 | 3/2020 | Ren et al. | |
| 2020/0238659 A1 | 7/2020 | Baser | |
| 2021/0008815 A1 | 1/2021 | Huoponen et al. | |
| 2021/0301433 A1 | 9/2021 | Bertrand et al. | |
| 2022/0112637 A1 | 4/2022 | Bertrand et al. | |

FOREIGN PATENT DOCUMENTS

| | | | |
|---|---|---|---|
| CN | 102747532 A | 10/2012 | |
| CN | 104652038 A | 5/2015 | |
| CN | 105088510 A | 11/2015 | |
| CN | 105172263 A | 12/2015 | |
| CN | 205009684 U | 2/2016 | |
| CN | 107130365 A | 9/2017 | |
| CN | 206512387 U | 9/2017 | |
| CN | 107225817 A | 10/2017 | |
| CN | 107458046 A | 12/2017 | |
| CN | 107475899 A | 12/2017 | |
| CN | 107974764 A | 5/2018 | |
| CN | 108842296 A | 11/2018 | |
| CN | 208346403 U | 1/2019 | |
| CN | 110042568 A | 7/2019 | |
| CN | 110067080 A | 7/2019 | |
| DE | 19913647 A1 | 9/2000 | |
| DE | 202010003638 U1 | 8/2010 | |
| DE | 102012101724 A1 | 9/2013 | |
| DE | 102012015448 A1 | 2/2014 | |
| DE | 102013223836 A1 | 5/2015 | |
| DE | 102014201099 A1 | 7/2015 | |
| DE | 102015210735 A1 | 12/2016 | |
| EP | 2657385 A1 | 10/2013 | |
| EP | 2769833 A1 | 8/2014 | |
| FR | 2890398 A1 | 3/2007 | |
| WO | 9417229 A1 | 8/1994 | |
| WO | 9965433 A1 | 12/1999 | |
| WO | 2005032804 A1 | 4/2005 | |
| WO | 2009142315 A1 | 11/2009 | |
| WO | 2013093053 A2 | 6/2013 | |
| WO | 2013160596 A1 | 10/2013 | |
| WO | 2014009314 A1 | 1/2014 | |
| WO | 2018187186 A1 | 10/2018 | |
| WO | 2019117029 A1 | 6/2019 | |

OTHER PUBLICATIONS

Office Action from Chinese Application No. 201980060150.2 dated Apr. 13, 2022.
Office Action from Chinese Application No. 201980060152.1 dated Apr. 25, 2022.
Office Action from Chinese Application No. 201980054758.4 dated Jan. 3, 2023.
Office Action from Chinese Application No. 201980060152.1 dated Jan. 28, 2023.
Office Action from Chinese Application No. 201980054758.4 dated Oct. 8, 2022.
Office Action from Indian Application No. 202137010640 dated Oct. 13, 2022.
Office Action from European Application No. 19762031.3 dated Dec. 8, 2022.
Office Action from European Application No. 19762033.9 dated Dec. 8, 2022.
Office Action from European Application No. 19762030.5 dated Dec. 6, 2022.
Office Action from Indian Application No. 202137006241 dated Nov. 21, 2022.
Office Action from Indian Application No. 202137010649 dated Aug. 5, 2022.
International Search Report and Written Opinion from PCT/US2019/046742 dated Oct. 31, 2019.
International Search Report and Written Opinion from PCT/US2019/046748 dated Nov. 19, 2019.
International Search Report and Written Opinion from PCT/US2019/046751 dated Nov. 19, 2019.
Iyer, "Directionally-oriented inlay warp knits—Some aspects of production and application," Indian Journal of Research, vol. 19, Sep. 1, 2014, pp. 195-202.
Vallons et al., "The influence of the stitching pattern on the internal geometry, quasi-static and fatigue mechanical properties of glass fibre non-crimp fabric composites," Composites Part A: Applied Science and Manufacturing, vol. 56, Jan. 1, 2014, pp. 272-279.
Office Action from Chinese Application No. 201980060150.2 dated Nov. 1, 2022.
Jia Lijun et al., "Composite Material Processing Technology," 2007, p. 127.
Office Action from Brazilian Application No. BR112021003190-1 dated Apr. 26, 2023.
Office Action from Brazilian Application No. BR112021003187-1 dated Apr. 26, 2023.
Office Action from Chinese Application No. 201980060150.2 dated Mar. 30, 2023.
Office Action from U.S. Appl. No. 17/266,093 dated May 1, 2023.
Office Action from Brazilian Application No. BR112021003184-7 dated May 16, 2023.
Office Action from U.S. Appl. No. 17/266,093 dated Jul. 7, 2023.

DETAIL A

DETAIL B

DETAIL C

MULTIAXIAL REINFORCING FABRIC WITH A STITCHING YARN FOR IMPROVED FABRIC INFUSION

CROSS-REFERENCE TO RELATED APPLICATIONS

This application is the U.S. national stage entry of PCT/US2019/046751, filed on Aug. 16, 2019, which claims priority to and any benefit of U.S. Provisional Patent Application No. 62/720,418, filed Aug. 21, 2018, the entire contents of which are incorporated herein by reference.

FIELD

The general inventive concepts relate to fiber reinforced materials and, more particularly, to systems for and methods of using a stitching yarn as part of a reinforcement fabric with improved infusion properties.

BACKGROUND

It is known to use fiber reinforced materials, often in the form of a non-woven fabric, to form structural components. The fabric is formed from a multitude of continuous fibers, each of the fibers including many individual continuous filaments. Within the fabric, most of the fibers are arranged side by side and substantially parallel to one another. The fibers are held together with the use of a stitching yarn. Such a fabric is referred to as a non-crimp fabric.

The fabric can have a thickness of 0.8 mm to several mm. The fabric can be formed to have almost any practical width. After production, the fabric can be wound up into rolls, each having a length of a couple hundred of meters.

As noted above, these fabrics are useful for forming structural components. For example, the fabric can be stacked up or otherwise layered to form a spar cap of a blade of a wind energy turbine. In particular, several layers of cut pieces of the fabric are arranged on top of each other to form the structural component. The pieces are arranged within specific areas and regions of a mold. An infusion process introduces a curable matrix material (a resin) into the mold in order to penetrate the layers of the fabric. A vacuum can be applied to the mold during the infusion process to press the layers of cut pieces together and aid the resin in penetrating the layers. Thereafter, the resin is cured to form the structural component.

During formation of the structural component, it is important that the resin fully and uniformly impregnate the fabric. The speed at which the resin can achieve this state for a particular fabric is the rate of infusion of the fabric.

It can be a challenge to satisfactorily impregnate certain fabrics at a desired (e.g., an economically acceptable) infusion rate. For example, hybrid fabrics (e.g., formed from glass fibers and carbon fibers) and heavier fabrics (e.g., having an area weight greater than 1,200 g/m$^2$) can be difficult to evenly impregnate and/or can take a relatively long time to do so. Consequently, there is an unmet need for reinforcement fabrics with improved infusion properties.

SUMMARY

It is proposed herein to provide fiber reinforced materials with improved infusion properties. The fiber reinforced materials are suitable for the production of structural components, such as wind turbine blades.

The invention relates generally to a reinforcement fabric, a method of producing the reinforcement fabric, and a composite part formed from the reinforcement fabric.

In one exemplary embodiment, a reinforcing fabric is provided. The reinforcing fabric comprises a plurality of first fibers oriented in a first direction; a plurality of second fibers oriented in a second direction; and a stitching yarn maintaining the first fibers and the second fibers in their respective orientations. The first direction is 0 degrees. The second direction is different from the first direction, wherein the second direction is within the range of 0 degrees to 90 degrees. The first fibers constitute between 91 wt. % and 99.5 wt. % of the fabric. The second fibers constitute between 0.5 wt. % and 9 wt. % of the fabric.

In some exemplary embodiments, all of the first fibers are glass fibers. In some exemplary embodiments, some of the first fibers are glass fibers. In some exemplary embodiments, none of the first fibers are glass fibers.

In some exemplary embodiments, all of the second fibers are glass fibers. In some exemplary embodiments, some of the second fibers are glass fibers. In some exemplary embodiments, none of the second fibers are glass fibers.

In some exemplary embodiments, all of the first fibers are carbon fibers. In some exemplary embodiments, some of the first fibers are carbon fibers. In some exemplary embodiments, none of the first fibers are carbon fibers.

In some exemplary embodiments, all of the second fibers are carbon fibers. In some exemplary embodiments, some of the second fibers are carbon fibers. In some exemplary embodiments, none of the second fibers are carbon fibers.

In some exemplary embodiments, the first fibers include at least two distinct types of fibers. In some exemplary embodiments, the two distinct types of fibers are glass fibers and carbon fibers. In some exemplary embodiments, the at least two distinct types of fibers are selected from the group consisting of glass fibers, basalt fibers, and carbon fibers.

In one exemplary embodiment, the stitching yarn constitutes less than 3 wt. % of the fabric.

In one exemplary embodiment, the stitching yarn is a polyester yarn.

In one exemplary embodiment, the stitching yarn has a linear mass density within the range of 60 dTex to 250 dTex. In one exemplary embodiment, the stitching yarn has a linear mass density greater than 85 dTex. In one exemplary embodiment, the stitching yarn has a linear mass density greater than 200 dTex. In one exemplary embodiment, the stitching yarn has a linear mass density greater than 225 dTex.

In one exemplary embodiment, a number of discrete filaments in the stitching yarn is within the range of 20 to 80. In one exemplary embodiment, the number of discrete filaments in the stitching yarn is within the range of 20 to 30. In one exemplary embodiment, the number of discrete filaments in the stitching yarn is within the range of 70 to 80.

In one exemplary embodiment, an average diameter of the filaments in the stitching yarn is within the range of 12 μm to 30 μm. In one exemplary embodiment, the average diameter of the filaments in the stitching yarn is greater than 12 μm.

In one exemplary embodiment, the stitching yarn has a crimp contraction (CC), prior to stitching, of at least 24%. In one exemplary embodiment, the stitching yarn has a CC, prior to stitching, within the range of 26% to 28%. In one exemplary embodiment, the stitching yarn has a CC, prior to stitching, within the range of 30% to 32%. In one exemplary embodiment, the stitching yarn has a CC, prior to stitching, within the range of 31% to 36%.

In one exemplary embodiment, the stitching yarn, after being unstitched from a fabric, has a crimp contraction (CC) less than or equal to 30%. In one exemplary embodiment, the unstitched stitching yarn has a CC within the range of 18% to 24%. In one exemplary embodiment, the unstitched stitching yarn has a CC within the range of 21% to 24%.

In one exemplary embodiment, the stitching yarn forms a stitching pattern through the fabric, the stitching pattern being a tricot stitching pattern.

In one exemplary embodiment, the stitching yarn forms a stitching pattern through the fabric, the stitching pattern being a symmetric double tricot stitching pattern.

In one exemplary embodiment, the stitching yarn forms a stitching pattern through the fabric, the stitching pattern being an asymmetric double tricot stitching pattern.

In one exemplary embodiment, the stitching yarn forms a stitching pattern through the fabric, the stitching pattern being a symmetric diamant stitching pattern.

In one exemplary embodiment, the stitching yarn forms a stitching pattern through the fabric, the stitching pattern being an asymmetric diamant stitching pattern.

In one exemplary embodiment, the stitching yarn defines a stitching length within the range of 3 mm to 6 mm. In one exemplary embodiment, the stitching yarn defines a stitching length of 5 mm. In one exemplary embodiment, the stitching yarn defines a stitching length of 4 mm.

In one exemplary embodiment, the stitching yarn is a single strand stitching yarn. In one exemplary embodiment, the stitching yarn is a double strand stitching yarn. In one exemplary embodiment, the stitching yarn is a triple strand stitching yarn.

In one exemplary embodiment, the first fibers are glass fibers and the second fibers are glass fibers, wherein a glass composition of the first fibers is the same as a glass composition of the second fibers.

In one exemplary embodiment, the first fibers are glass fibers and the second fibers are glass fibers, wherein a glass composition of the first fibers differs from a glass composition of the second fibers.

In one exemplary embodiment, the reinforcing fabric further comprises a plurality of third fibers oriented in a third direction, wherein the second fibers are glass fibers and the third fibers are glass fibers, and wherein a glass composition of the second fibers is the same as a glass composition of the third fibers.

In one exemplary embodiment, an absolute value of the second direction is equal to an absolute value of the third direction.

In one exemplary embodiment, a difference between the first direction and the second direction is greater than or equal to 45 degrees.

In one exemplary embodiment, a difference between the first direction and the second direction is greater than or equal to 80 degrees.

In one exemplary embodiment, a linear mass density of the first fibers is within the range of 600 Tex to 4,800 Tex.

In one exemplary embodiment, the second fibers are glass fibers, wherein a linear mass density of the second fibers is within the range of 68 Tex to 300 Tex.

In general, the reinforcing fabric is a non-crimp fabric. In one exemplary embodiment, the reinforcing fabric is a unidirectional, non-crimp fabric. In one exemplary embodiment, the reinforcing fabric is a multidirectional, non-crimp fabric. In general, the reinforcing fabric (as formed) contains no resin, i.e., none of the fibers forming the fabric are pre-impregnated with a resin.

In general, the reinforcing fabric has an area weight greater than 600 g/m².

In one exemplary embodiment, the reinforcing fabric is a "heavy" fabric having an area weight greater than 1,200 g/m². In one exemplary embodiment, the reinforcing fabric has an area weight greater than or equal to 1,800 g/m². In one exemplary embodiment, the reinforcing fabric has an area weight greater than or equal to 2,000 g/m². In one exemplary embodiment, the reinforcing fabric has an area weight greater than or equal to 2,400 g/m².

In one exemplary embodiment, the fabric is infused with a resin that is cured to form a composite article. In one exemplary embodiment, the article is a wind turbine blade or related component (e.g., spar cap).

Other aspects, advantages, and features of the inventive concepts will become apparent to those skilled in the art from the following detailed description, when read in light of the accompanying drawings.

BRIEF DESCRIPTION OF THE DRAWINGS

The general inventive concepts, as well as embodiments and advantages thereof, are described below in greater detail, by way of example, with reference to the drawings in which:

FIG. 1A is a top plan view of the reinforcing fabric. FIG. 1B is a bottom plan view of the reinforcing fabric. FIG. 1C is a detailed view of the circle A in FIG. 1A. FIG. 1D is a detailed view of the circle B in FIG. 1B.

FIG. 2A shows a tricot stitching pattern. FIG. 2B shows a symmetric double tricot stitching pattern. FIG. 2C shows an asymmetric double tricot stitching pattern. FIG. 2D shows a symmetric diamant stitching pattern. FIG. 2E shows an asymmetric diamant stitching pattern.

DETAILED DESCRIPTION

Figure 1A:
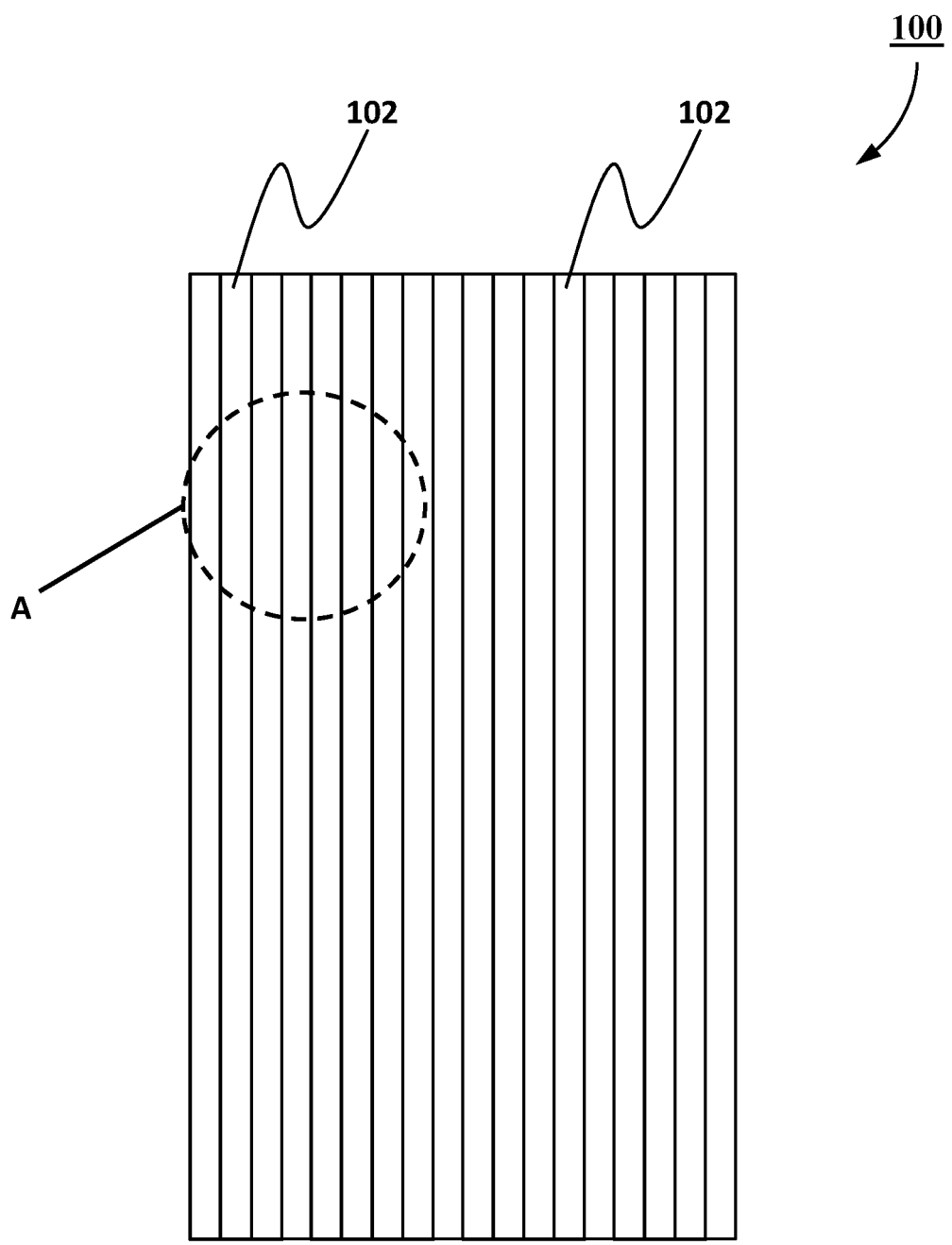
FIGS. 1A-1D illustrate a reinforcing fabric, according to an exemplary embodiment of the invention.
Figure 1B:
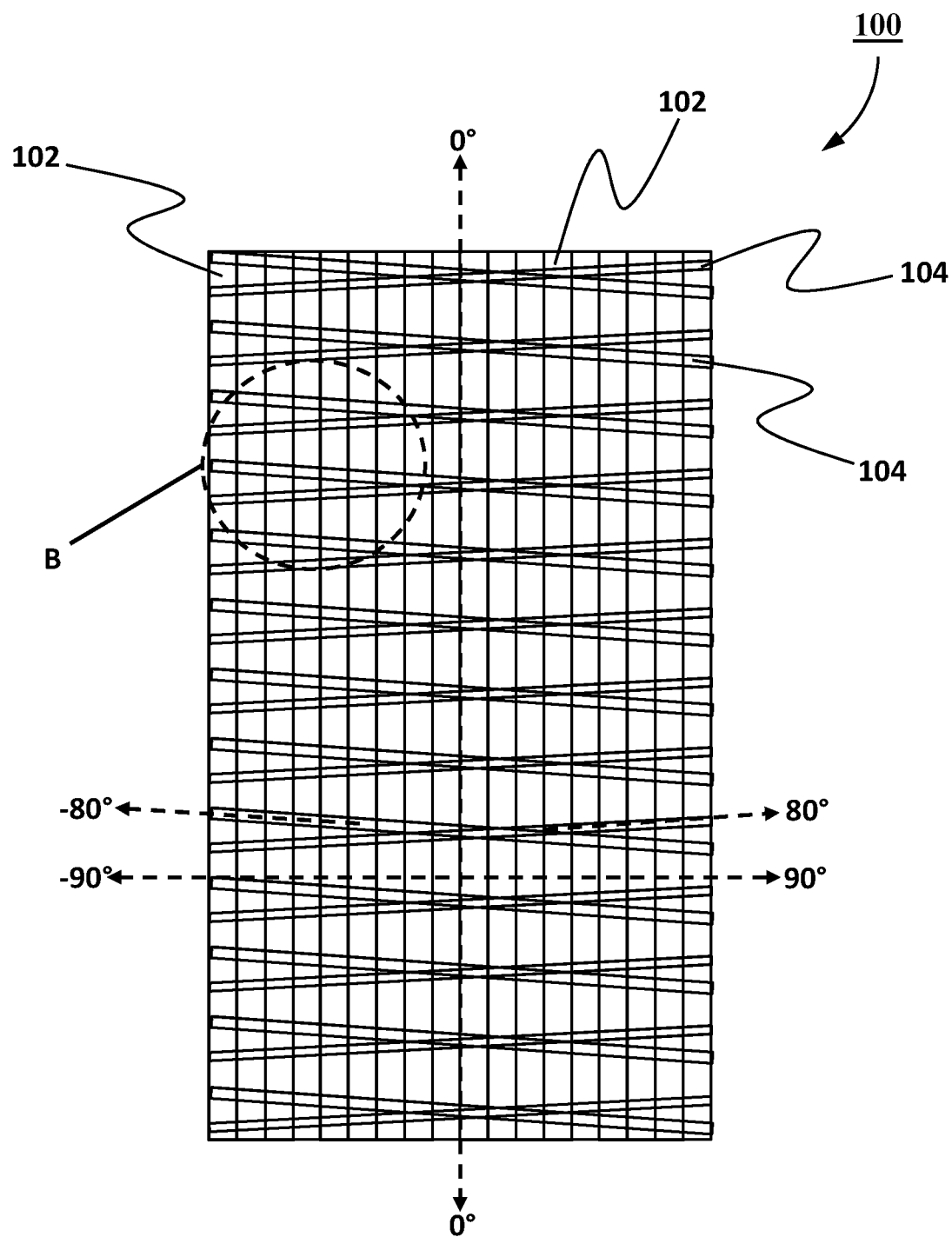

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

It has been discovered that by using a stitching yarn with a specific combination of features, a reinforcing fabric can be constructed that exhibits improved infusion properties. In particular, by controlling one or more specific product variables including, but not necessarily limited to, fabric area weight, stitching yarn composition, stitching yarn density, stitching yarn filament count, stitching yarn filament diameter, stitching yarn crimp contraction, stitching pattern, and stitching length, a reinforcement fabric can be produced that is an effective reinforcement for structural components (e.g., wind turbine blades) and that exhibits an enhanced rate of infusion.

Additionally, embodiments of the reinforcing fabric that include fibers with different moduli oriented in the same direction (e.g., glass fibers and carbon fibers), along with fibers oriented in another (i.e., different) direction may exhibit improved mechanical dampening in certain applications, such as in wind turbine blades.

Accordingly, the inventive concepts provide a reinforcement fabric comprising a plurality of fibers. The reinforcement fabric can be readily infused at an acceptable infusion speed, without requiring that the fibers used to form the reinforcement fabric be spread or pre-impregnated with resin. Thus, the inventive fabric provides for an effective one-step (i.e., in the mold) infusion process during composite part formation. The inventive concepts also encompass a method of producing the reinforcing fabric. The inventive concepts also encompass a composite part formed from the reinforcing fabric.

In an exemplary embodiment of the invention, a reinforcement fabric 100 is constructed from first reinforcing fibers 102 and second reinforcing fibers 104, as shown in FIGS. 1A-1D. For purposes of this illustrative embodiment, the first reinforcing fibers 102 and the second reinforcing fibers 104 are glass fibers.

Any suitable glass reinforcing fibers 102, 104 can be used in the reinforcement fabric 100. For example, fibers made from E glass, H glass, S glass, and AR glass types can be used. In some exemplary embodiments, basalt fibers can be used in place of some or all of the glass reinforcing fibers 102. In general, the glass reinforcing fibers 102, 104 have a diameter within the range of 13 µm to 24 µm. Typically, the glass reinforcing fibers 102, 104 in the reinforcement fabric 100 are glass fiber strands (fed from one or more glass rovings) made up of many individual glass filaments.

The reinforcement fabric 100 is a non-crimp fabric, wherein the fibers 102, 104 are arranged in their respective positions/orientations and then held together by a stitching yarn 106. The stitching yarn 106 is a textured, multifilament yarn comprised of many individual filaments. The stitching yarn 106 may be a single, double, or triple strand yarn. In some embodiments, the stitching yarn 106 is polyester.

In some embodiments, the filaments of the stitching yarn 106 are made of a polymer selected from the group consisting of polyester, polyamide, polyethylene, polypropylene, polyactic acid, aramide, and polybutylene succinate.

In some embodiments, the stitching yarn 106 has a linear mass density within the range of 70 dTex to 250 dTex. In some embodiments, the stitching yarn 106 has a linear mass density greater than 85 dTex. In some embodiments, the stitching yarn 106 has a linear mass density greater than 200 dTex. In some embodiments, the stitching yarn 106 has a linear mass density greater than 225 dTex. If the stitching yarn 106 comprises multiple strands, the linear mass density is the sum of the densities of the strands.

In some exemplary embodiments, the number of discrete filaments in the stitching yarn 106 is within the range of 20 to 80. In some exemplary embodiments, the number of discrete filaments in the stitching yarn 106 is within the range of 20 to 30. In some exemplary embodiments, the number of discrete filaments in the stitching yarn 106 is within the range of 70 to 80.

In some exemplary embodiments, an average diameter of the filaments in the stitching yarn 106 is within the range of 12 µm to 30 µm. In some exemplary embodiments, an average diameter of the filaments in the stitching yarn 106 is greater than 12 µm.

Another characteristic that was found to impact the infusion rate of a reinforcing fabric is the crimp contraction of a stitching yarn (e.g., the stitching yarn 106) used to form the fabric (e.g., the reinforcement fabric 100). Crimp contraction refers to the contraction of a texturized filament yarn resulting from the development of crimp, expressed as a percentage of its original length, with the lengths of the contracted and straightened yarns measured under specific conditions, derived from the EN 14621:2005 standard. According to this test, the crimp of a specimen of a texturized filament yarn of known nominal linear density, which is formed into the shape of a loop, is developed by treatment with hot air while the specimen is subjected to a low tensile force. The dimensions of this loop approximate those of the skein described in the EN 14621:2005 standard. After reconditioning, the straightened length of the loop is measured under a high tensile force. After a specified recovery time under application of the low tensile force, the contracted length of the loop, shortened by the effect of the yarn crimp, is measured. Crimp contraction is calculated as the difference between the two length values related to the straightened length. More specifically, the crimp contraction (CC), expressed in percent, is calculated using Equation 1:

$$CC = 100 \times [(L_0 - L_1)/L_0] (\%) \qquad \text{Equation 1}$$

where
$L_0$ is the straightened length; and
$L_1$ is the contracted length.

In some exemplary embodiments, the stitching yarn of the present invention (e.g., the stitching yarn 106) has a CC, prior to stitching, of at least 24%. In some exemplary embodiments, the stitching yarn has a CC within the range of 26% to 28%. In some exemplary embodiments, the stitching yarn has a CC within the range of 30% to 32%. In some exemplary embodiments, the stitching yarn has a CC within the range of 31% to 36%.

In some exemplary embodiments, the stitching yarn, after being unstitched from a fabric (e.g., the reinforcement fabric 100), exhibits a reduction in crimp contraction (CC) of no more than 30%. In some exemplary embodiments, the stitching yarn, after being unstitched from a fabric (e.g., the reinforcement fabric 100), exhibits a reduction in crimp contraction of no more than 25%.

In some exemplary embodiments, the stitching yarn, after being unstitched from a fabric (e.g., the reinforcement fabric 100), has a CC in the range of less than or equal to 30%. In some exemplary embodiments, the stitching yarn, after being unstitched from the fabric, has a CC in the range of 18% to 24%. In some exemplary embodiments, the stitching yarn, after being unstitched from the fabric, has a CC in the range of 21% to 24%. In some exemplary embodiments, the stitching yarn, after being unstitched from the fabric, has a CC of approximately 29%. In some exemplary embodiments, the stitching yarn, after being unstitched from the fabric, has a CC of approximately 25%. In some exemplary embodiments, the stitching yarn, after being unstitched from the fabric, has a CC of approximately 22%. In some exemplary embodiments, the stitching yarn, after being unstitched from the fabric, has a CC of approximately 12%.

Figure 1C:
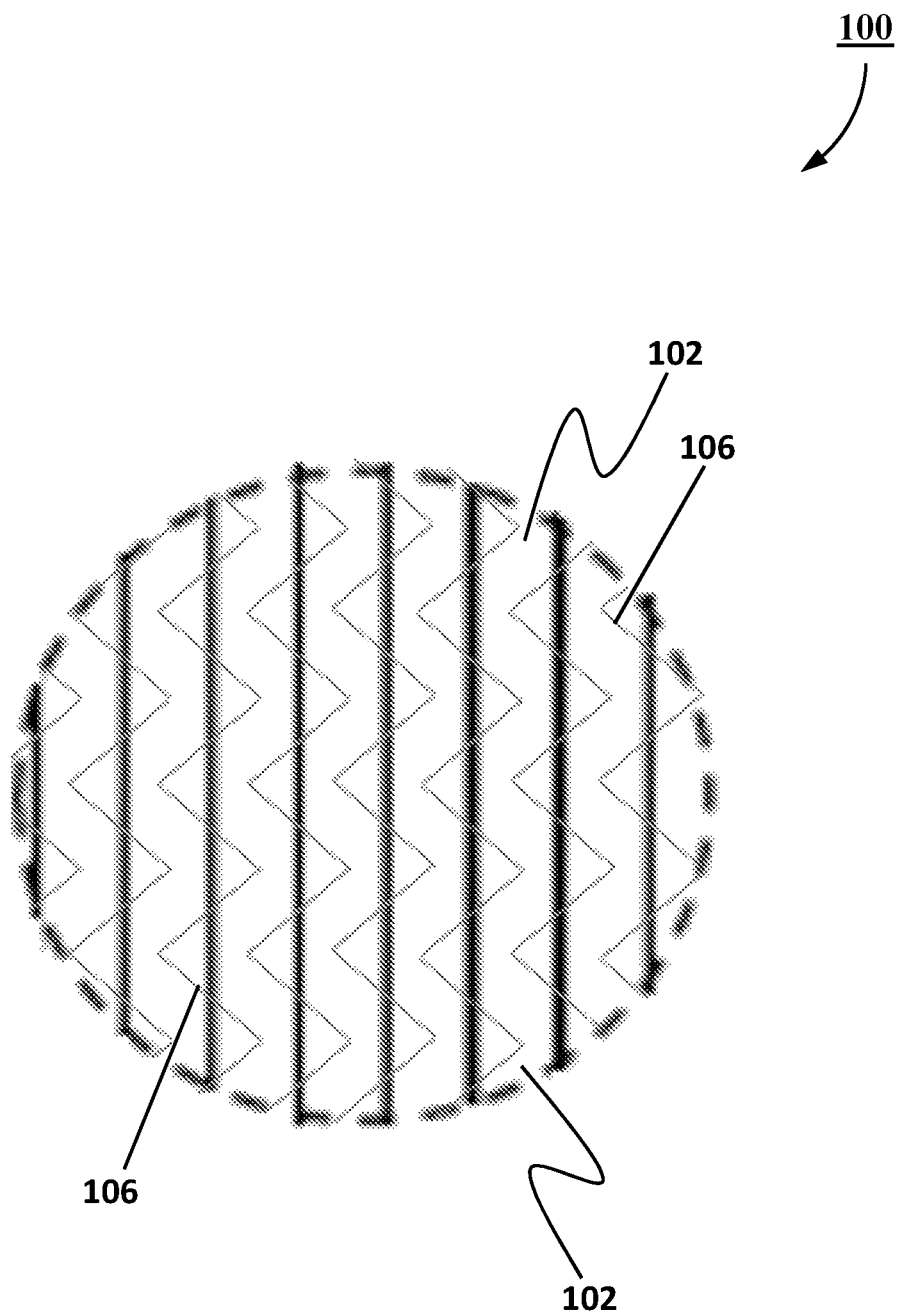
Figure 1D:
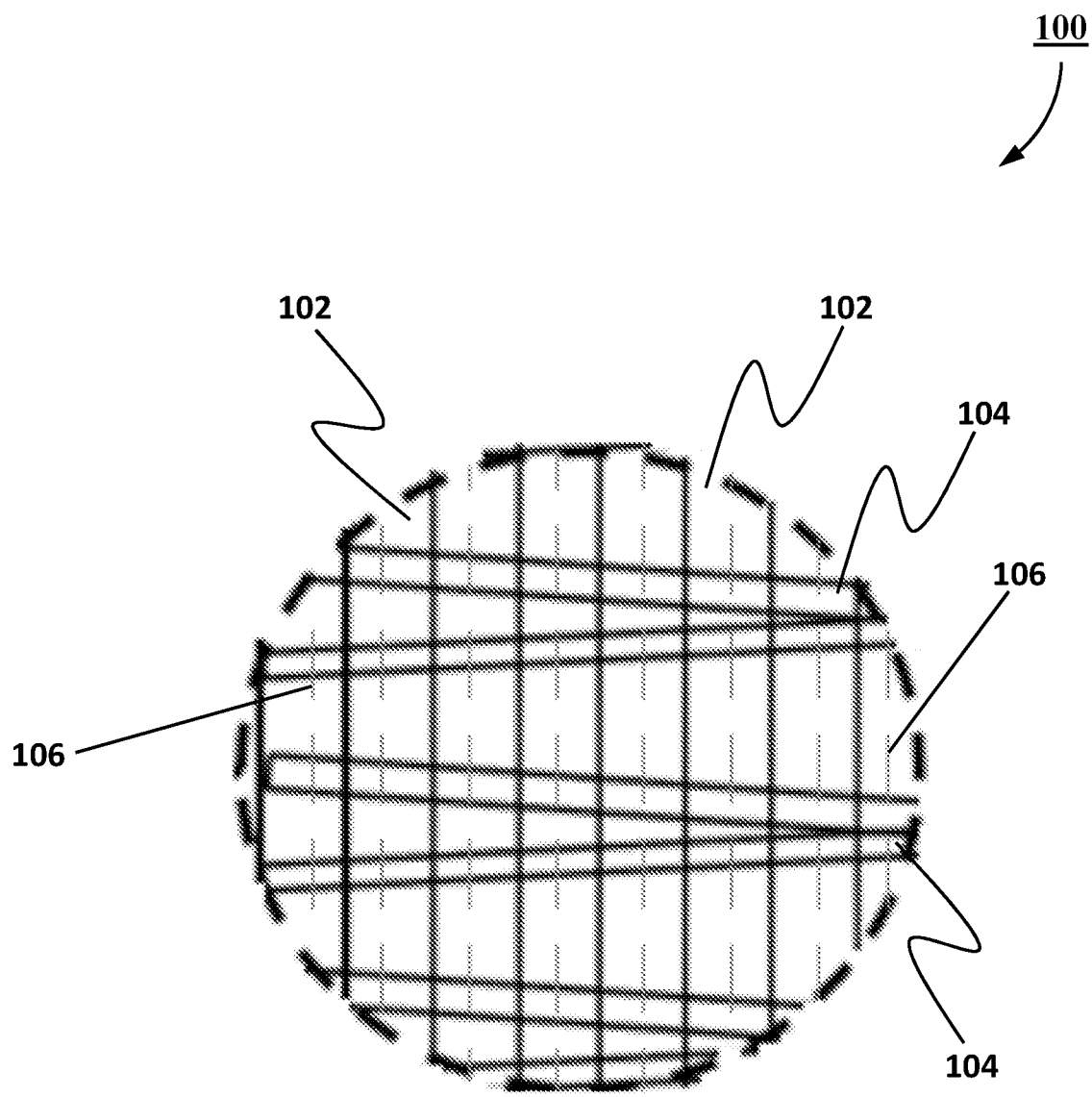
Figure 2A:
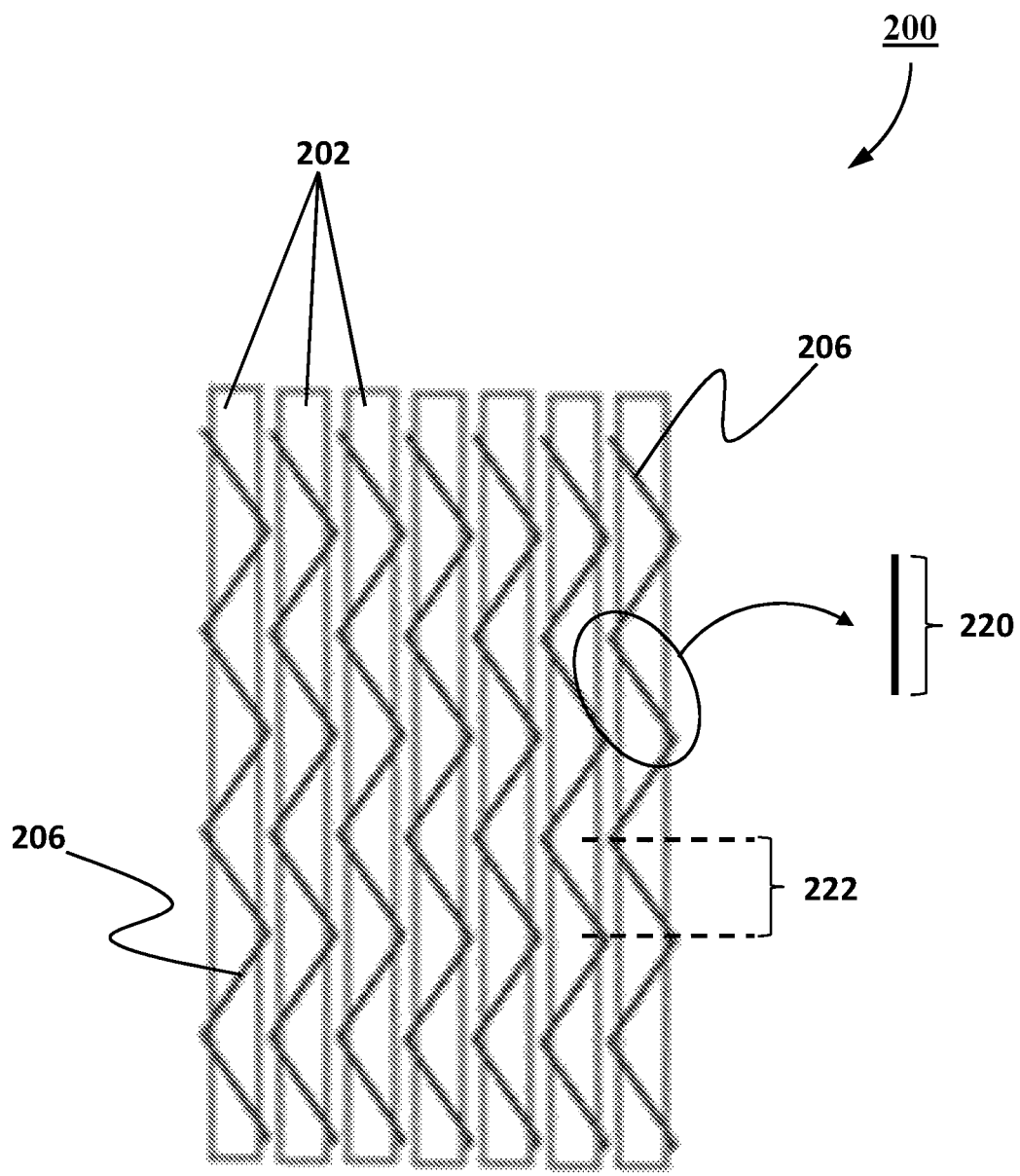
FIGS. 2A-2E illustrate several exemplary stitching patterns that can be used in the reinforcing fabric of FIG. 1.
Figure 2B:
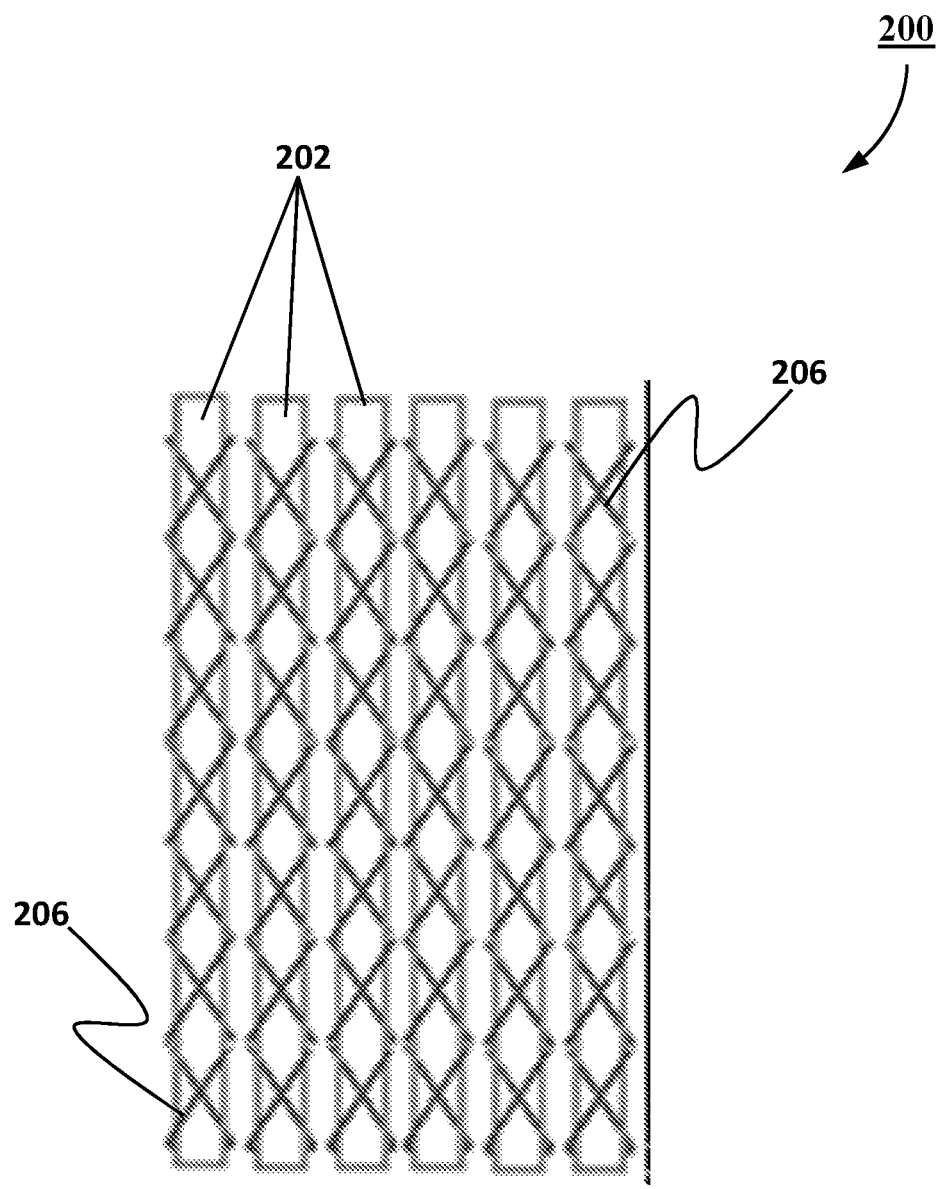
Figure 2C:
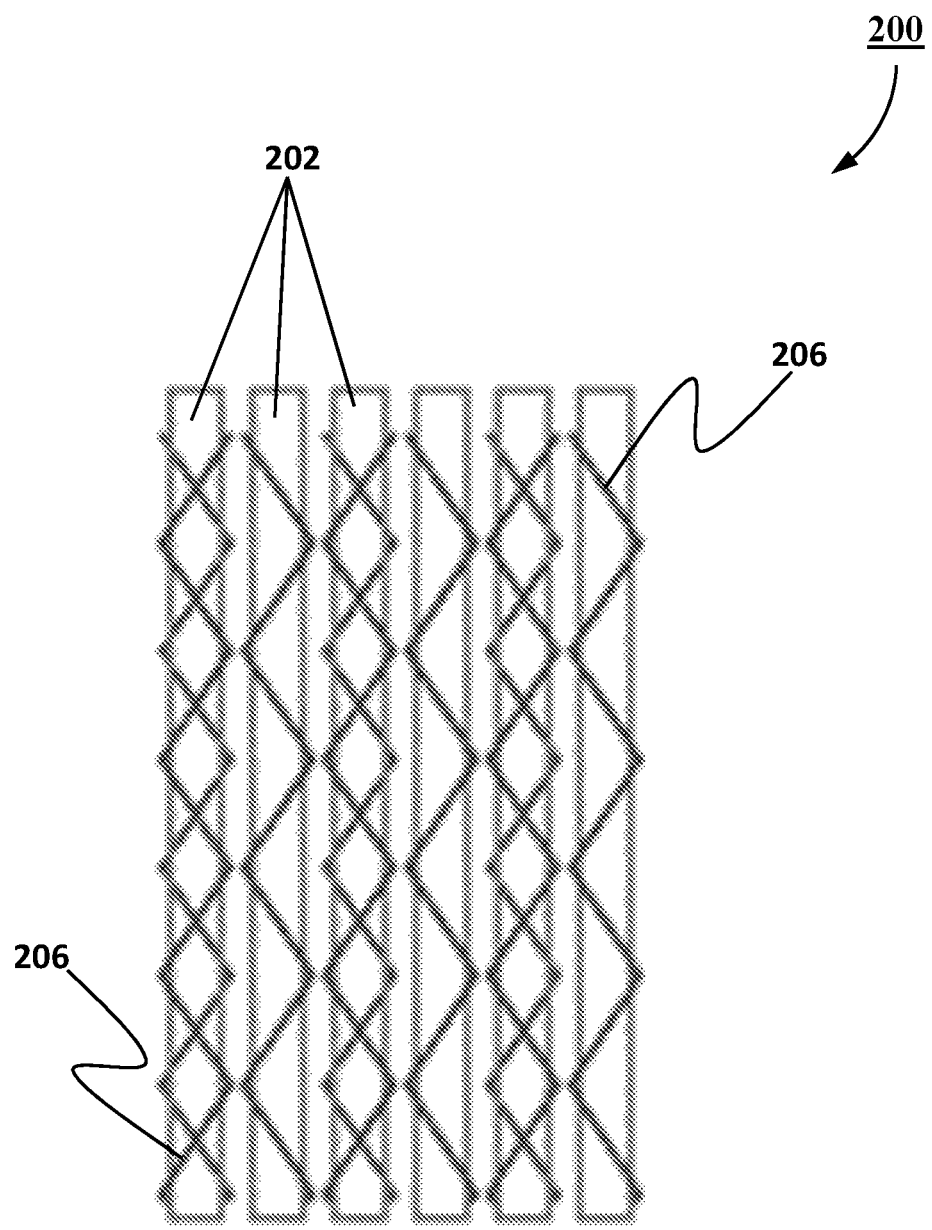
Figure 2D:
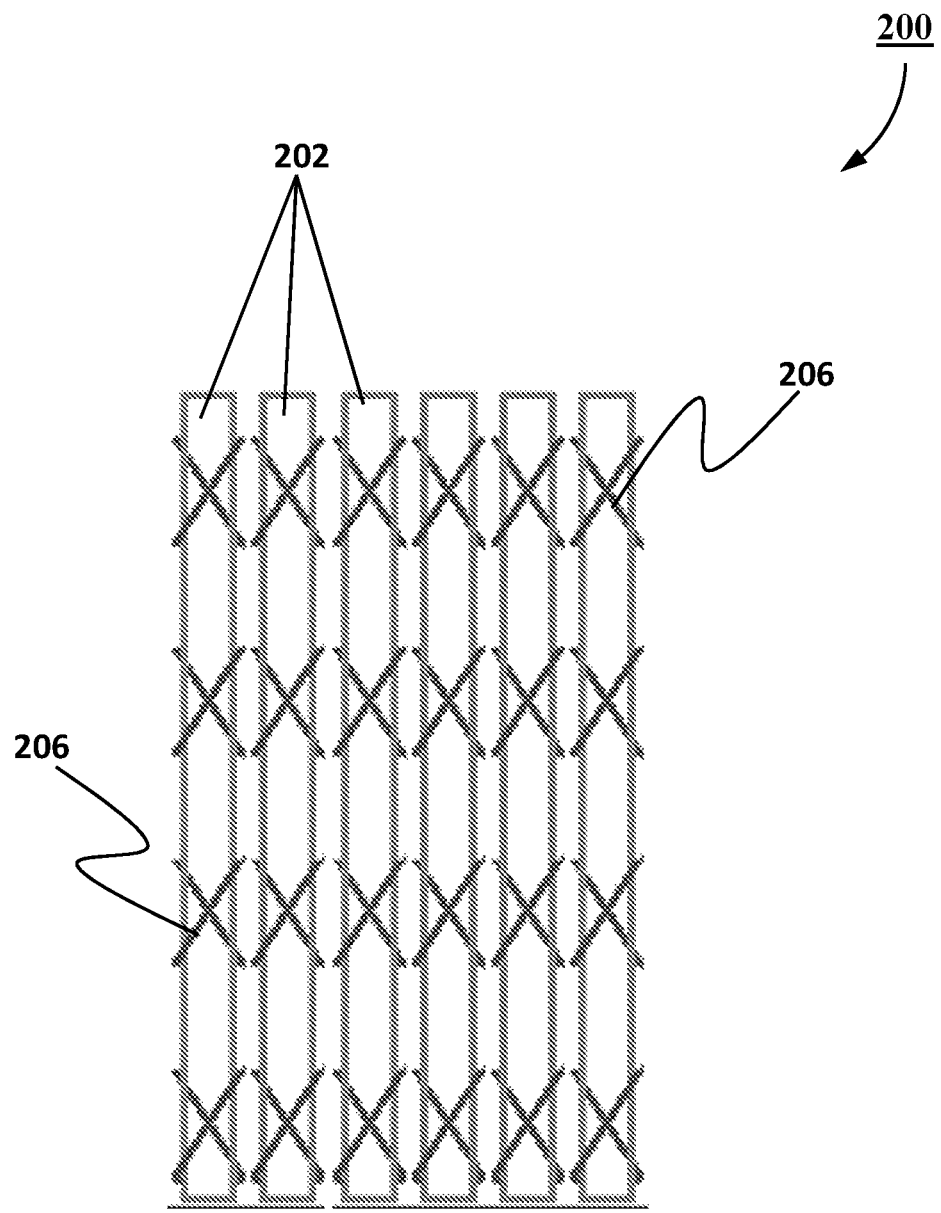
Figure 2E:
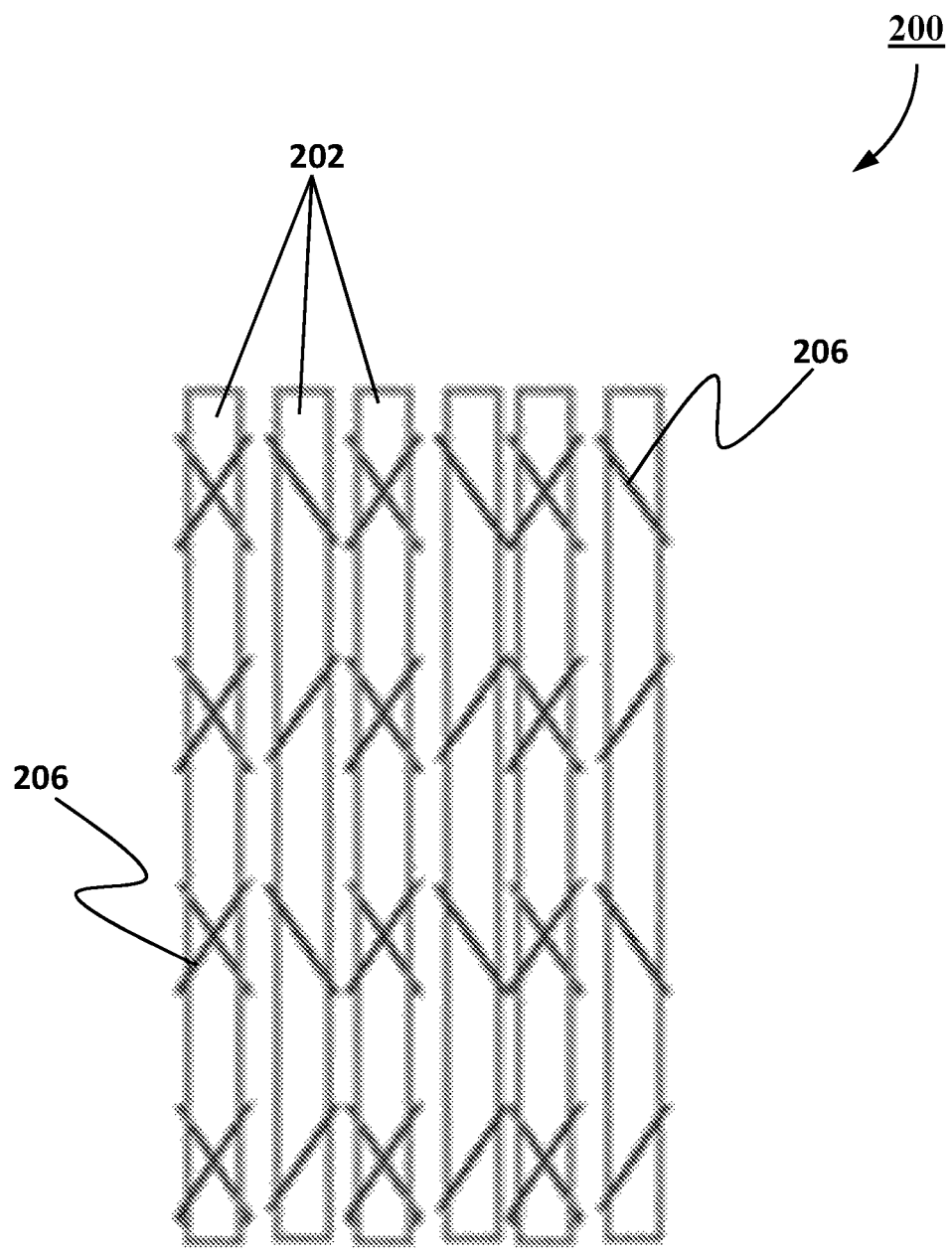

Any stitching pattern suitable to hold the fibers 102, 104 of the fabric 100 together can be used. Various exemplary stitching patterns 200 are shown in FIGS. 2A-2E. A tricot stitching pattern 200 in which reinforcing fibers 202 (e.g., the fibers 102, 104) are held together by a stitching yarn 206 (e.g., the stitching yarn 106) is shown in FIG. 2A. A symmetric double tricot stitching pattern 200 in which the reinforcing fibers 202 (e.g., the fibers 102, 104) are held together by the stitching yarn 206 (e.g., the stitching yarn 106) is shown in FIG. 2B. An asymmetric double tricot stitching pattern 200 in which the reinforcing fibers 202 (e.g., the fibers 102, 104) are held together by the stitching yarn 206 (e.g., the stitching yarn 106) is shown in FIG. 2C. A symmetric diamant (diamond-like) stitching pattern 200 in which the reinforcing fibers 202 (e.g., the fibers 102, 104) are held together by the stitching yarn 206 (e.g., the stitching yarn 106) is shown in FIG. 2D. An asymmetric diamant (diamond-like) stitching pattern 200 in which the reinforcing fibers 202 (e.g., the fibers 102, 104) are held together by the stitching yarn 206 (e.g., the stitching yarn 106) is shown in FIG. 2E. The general inventive concepts may encompass other stitching patterns as well. FIGS. 1C-1D illustrate a tricot stitching pattern used in the fabric 100.

In general, the stitching pattern 200 is a repeating series of stitches, with transitions between each individual stich portion 220 defining a stitching length 222 (see FIG. 2A). The stitching length 222 is another variable that can influence the rate of infusion of the fabric 100. Typically, the stitching length 222 will be within the range of 3 mm to 6 mm. In some exemplary embodiments, the stitching length 222 is 4 mm. In some exemplary embodiments, the stitching length 222 is 5 mm.

The reinforcement fabric 100 is a unidirectional fabric, wherein between 91 wt. % to 99.5 wt. % of the first reinforcing fibers 102, 104 are oriented in a first direction and 0.5 wt. % to 9 wt. % of the second reinforcing fibers 102, 104 are oriented in one or more other directions (e.g., second and third directions). In some exemplary embodiments, the reinforcement fabric could be a non-unidirectional fabric, such as a biaxial or triaxial fabric.

Typically, the first direction will be 0° (lengthwise direction of the fabric).

The second direction is different from the first direction. The second direction will generally be within the range of greater than 0° to less than or equal to 90°.

The third direction is different from the first direction. The third direction will generally be greater than 0° and less than or equal to 90°.

The third direction may be the same as the second direction (such that there are only two distinct fiber orientations in the fabric). Otherwise, the third direction will typically be equal to the negative orientation of the second direction.

In the reinforcement fabric 100 shown in FIGS. 1A-1D, the first direction is 0°, the second direction is 80°, and the third direction is −80°.

In some exemplary embodiments, all of the reinforcing fibers oriented in the second direction are glass reinforcing fibers 104.

In some exemplary embodiments, all of the reinforcing fibers oriented in the third direction are glass reinforcing fibers 104.

In some exemplary embodiments, the first glass reinforcing fibers 102 oriented in the first direction include a different glass composition than the second glass reinforcing fibers 104 oriented in the second direction.

In some exemplary embodiments, the first glass reinforcing fibers 102 oriented in the first direction include a different glass composition than the second glass reinforcing fibers 104 oriented in the third direction.

In some exemplary embodiments, the glass reinforcing fibers 104 oriented in the second direction include the same glass composition as the glass reinforcing fibers 104 oriented in the third direction.

As noted above, the reinforcement fabric 100 comprises between 91 wt. % to 99.5 wt. % of the first glass reinforcing fibers 102 and between 0.5 wt. % to 9 wt. % of the second glass reinforcing fibers 104. The stitching yarn 106 comprises a maximum of 3 wt. % of the fabric 100.

The linear mass density of the first glass reinforcing fibers 102 being fed in the first direction is within the range of 600 Tex to 4,800 Tex. The linear mass density of the second glass reinforcing fibers 104 being fed in the non-first direction (i.e., the second/third directions) is within the range of 68 Tex to 300 Tex.

As known in the art, the glass reinforcing fibers 102 and/or 104 may have a chemistry applied thereon during formation of the fibers. This surface chemistry, typically in an aqueous form, is called a sizing. The sizing can include components such as a film former, lubricant, coupling agent (to promote compatibility between the glass fibers and the polymer resin), etc. that facilitate formation of the glass fibers and/or use thereof in a matrix resin. In some exemplary embodiments, the glass reinforcing fibers 102 and/or 104 include a polyester compatible sizing. In some exemplary embodiments, the glass reinforcing fibers 102 and/or 104 include an epoxy compatible sizing.

In some exemplary embodiments, the glass reinforcing fibers 102 and/or 104 may also have a post-coating applied thereto. Unlike a sizing, the post-coating is applied after formation of the fibers.

The reinforcing fabrics disclosed herein (e.g., the reinforcement fabric 100) have combinations of structural components and/or properties that improve the resin infusion rate of the fabrics, even when the reinforcing fibers making up the fabric are not pre-impregnated with resin. As noted above, these components/properties may include the fabric area weight, stitching yarn composition, stitching yarn density, stitching yarn filament count, stitching yarn filament diameter, stitching yarn crimp contraction, stitching pattern, and stitching length used in the reinforcing fabrics.

Figure 3:
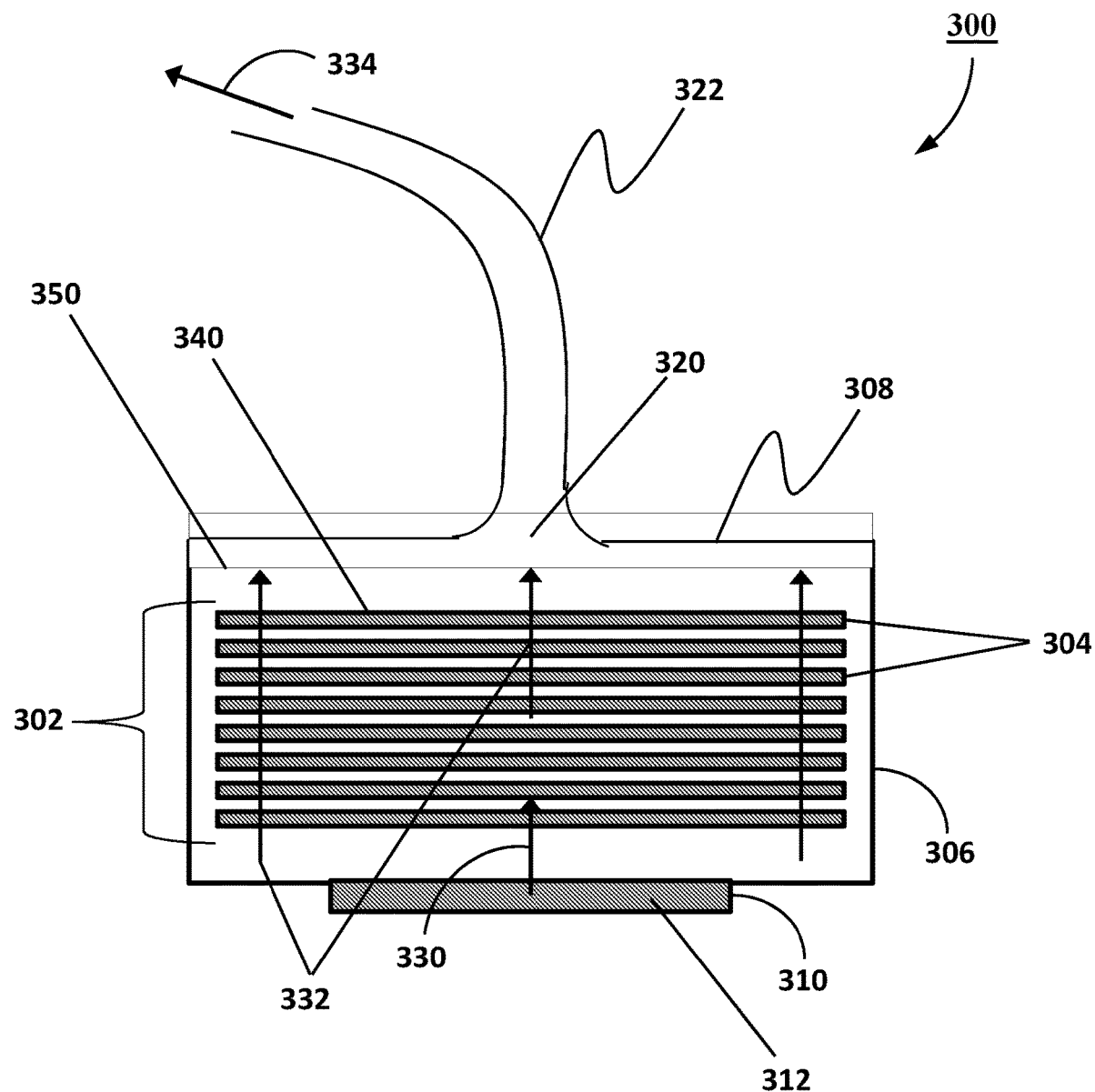
FIG. 3 is a diagram illustrating a through thickness infusion speed (TTIS) test for measuring the infusion rate of a fabric.

One test for the measuring the resin infusion rate of a fabric is called the through thickness infusion speed (TTIS) test. The TTIS test will be explained with reference to FIG. 3. In the TTIS test 300, multiple layers 302 of a fabric 304 to be tested (e.g., the reinforcement fabric 100) are placed on an infusion table 306. In general, many layers 302 of the fabric 304 are used for the TTIS test 300. Typically, the number of layers 302 is based on a target "testing thickness." In some exemplary embodiments, the target thickness is 30 mm. A vacuum foil 308 is placed over the layers 302 on top of the table 306 to form an airtight enclosure 350 (i.e., vacuum bag).

A supply 310 of resin 312 is situated below, or otherwise in proximity to, the table 306, such that the resin 312 can be drawn into the enclosure 350 (e.g., through one or more openings (not shown) in the bottom of the table 306) below the layers 302 of the fabric 304. In some exemplary embodiments, the resin 312 is located remote from the table 306, but is fed thereto through a supply hose (not shown). An opening 320 in the vacuum bag formed from the foil 308 is interfaced with a hose 322 so that a vacuum source (not shown) can be used to evacuate air from the enclosure 350 and suck the resin 312 through the fabric 304.

In this manner, the resin 312 is pulled from the supply 310 into the enclosure 350 (see arrow 330); through the layers 302 of the fabric 304 (see arrows 332); and out the opening 320 through the hose 322 (see arrow 334). Given the close-fitting dimensions of the layers 302 of the fabric 304 within the enclosure 350, the only path for the resin 312 to travel is through the layers 302 of the fabric 304, i.e., through the thicknesses (z-direction) of the layers 302 of the fabric 304. The TTIS test 300 measures the amount of time it takes until the resin 312 is first visible on an upper surface 340 of a top layer 302 of the fabric 304. This amount of time (e.g., in minutes) is used as a measure of the rate of infusion of the fabric 304. The TTIS test 300 can be used to compare the rates of infusion of different fabrics, so long as the other testing parameters are substantially the same. Additionally, for comparison purposes, the fabrics should have similar grammage.

Figure 4A:
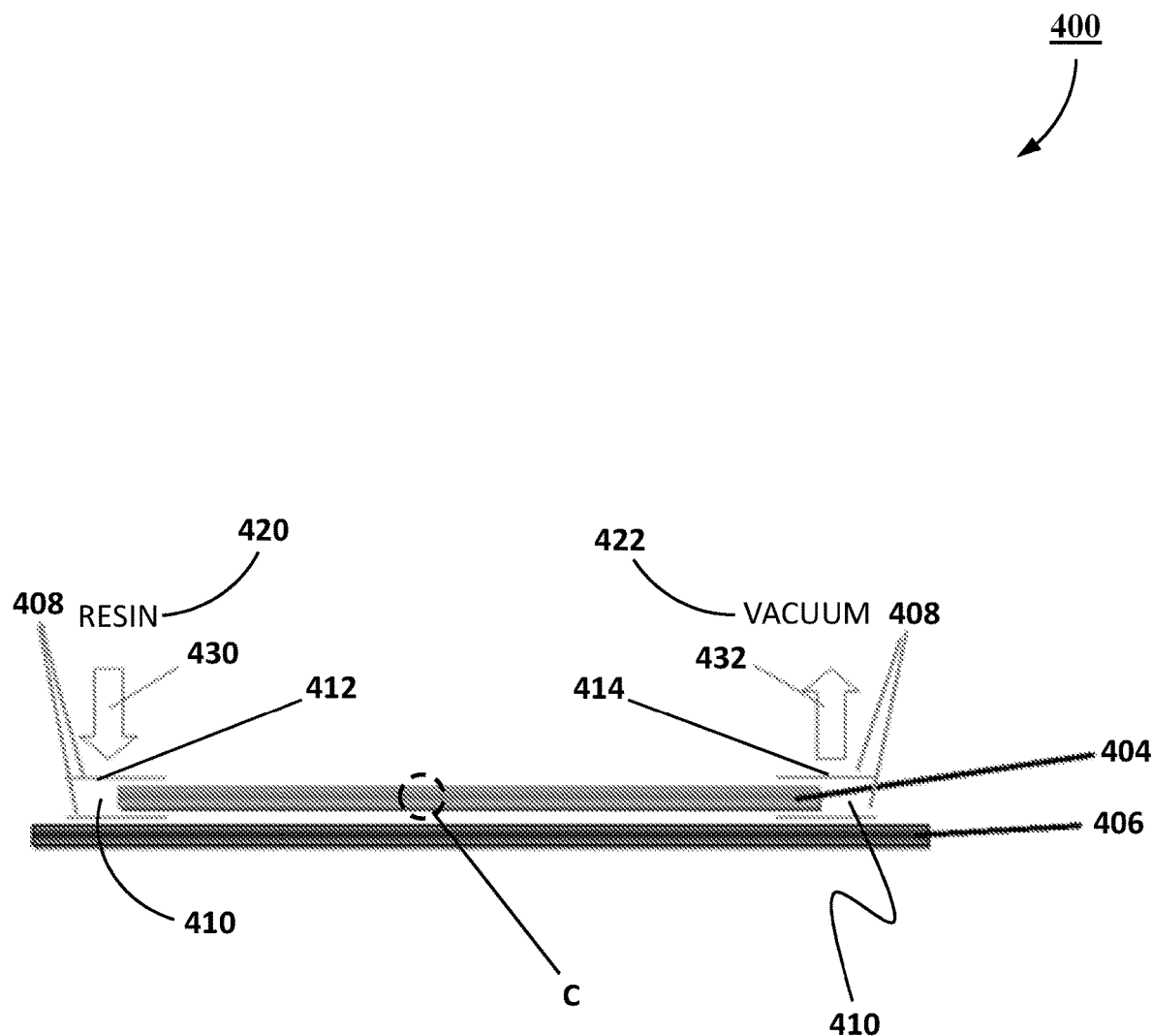
FIGS. 4A-4B illustrate an in-plane infusion test (IPIT) test for measuring the infusion rate of a fabric.
Figure 4B:
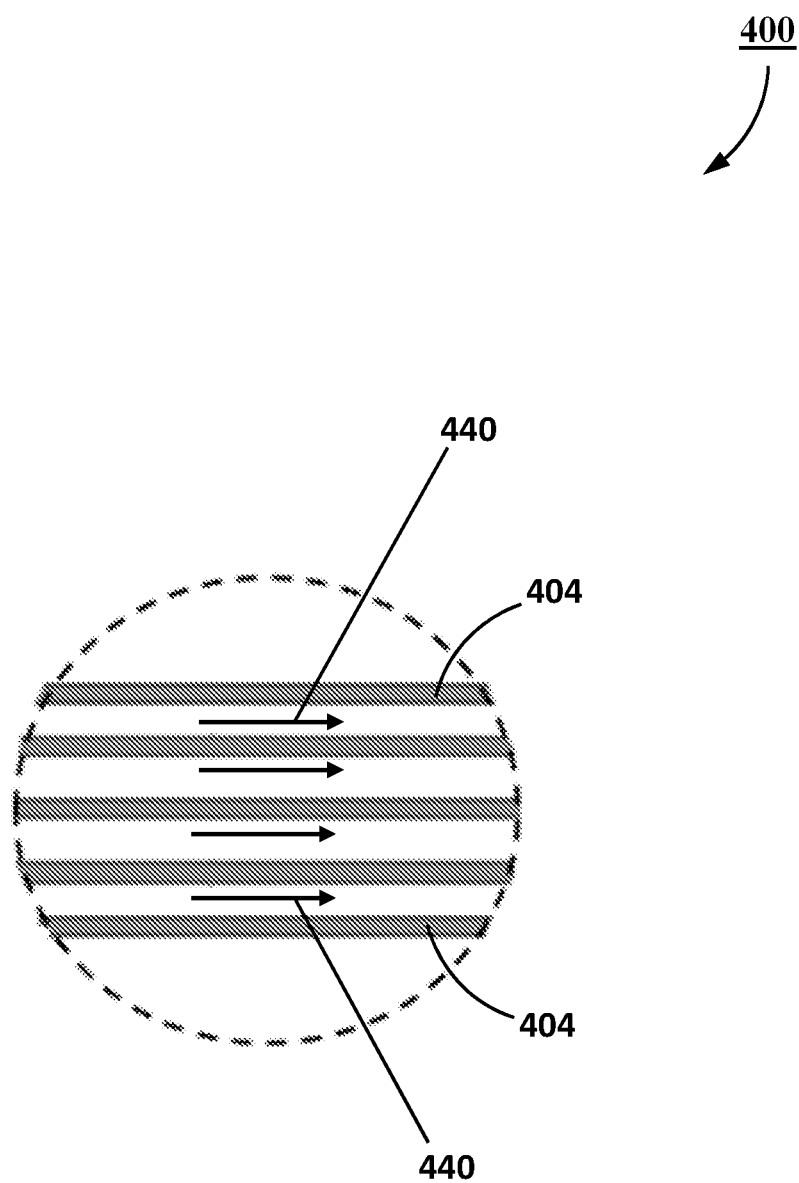

Another test for the measuring the resin infusion rate of a fabric is called the in-plane infusion test (IPIT) test. The IPIT test will be explained with reference to FIGS. 4A-4B. In the IPIT test 400, five (5) layers of a fabric 404 to be tested (e.g., the reinforcement fabric 100) are placed on an infusion table 406. A vacuum foil 408 is placed over the edges of the layers on top of the table 406, and sealed to the table 406 (e.g., using tape), to form an airtight enclosure 410 (i.e., vacuum bag).

All of the layers of the fabric 404 in the enclosure 410 are aligned with one another so as to face in the same direction (e.g., the first orientation of each layer of the fabric 404 aligns with the first orientation of each other layer of the fabric 404) within the enclosure 410.

The vacuum foil 408 (and tape) form the airtight enclosure 410 except for an input opening 412 and an output opening 414 formed near opposite ends of the fabric 404.

A supply of resin 420 is situated adjacent to, or otherwise in proximity to, the input opening 412. As configured, the resin 420 can be drawn into the enclosure 410 through the input opening 412. In some exemplary embodiments, the resin 420 is located remote from the table 406, but is fed thereto through a supply hose (not shown) interfaced with the input opening 412. The output opening 414, on the other side of the enclosure 410, is interfaced with a hose (not shown) so that a vacuum source 422 can be used to evacuate air from the enclosure 410 and suck the resin 420 through the fabric 404.

In this manner, the resin 420 is pulled from the supply into the enclosure 410 (see arrow 430); through the layers of the fabric 404 (see arrows 440 in FIG. 4B); and out the opening 414 through the hose (see arrow 432). Given the close-fitting dimensions of the layers of the fabric 404 within the enclosure 410, the only path for the resin 420 to travel is through the layers of the fabric 404, i.e., through the length (x-direction, production direction) or width (y-direction) of the layers of the fabric 404, depending on the orientation of the fabric 404 between the openings 412, 414 of the enclosure 410. Thus, only the resin channels within the layers of the fabric 404 are used to transport the resin 420.

The IPIT test 400 measures the distance covered by the resin 420 over time. A flow front (distance) of the resin 420 is recorded after 2, 4, 6, 8, 10, 12, 16, 20, 26, 32, 38, 44, 50, 55, and 60 minutes. The current distance that the resin 420 has traveled through the fabric 404 is referred to as the infusion length. The measured amount of time (e.g., in minutes) relative to the infusion length (e.g., in centimeters) is used as a measure of the rate of infusion of the fabric 404.

The IPIT test 400 can be used to compare the rates of infusion of different fabrics, so long as the other testing parameters are substantially the same. Additionally, for comparison purposes, the fabrics should have similar warp grammage.

EXAMPLES

Eleven (11) candidate fabrics, each formed using a different stitching yarn, were identified. An assessment of five (5) of these samples was performed with the results being shown in Table 1.

TABLE 1

| | | Parameter | | | |
| --- | --- | --- | --- | --- | --- |
| Sample # | dTex | Approximate Filament Count | Average Filament Diameter (μm) | Crimp Contraction (%) | Infusion Properties |
| 1 | 111 | 38 | 16.58 | 23.8 | Not Tested |
| 2 | 83 | 39 | 14.18 | 22.9 | Not Tested |
| 3 | 88 | 25 | 17.9 | 31 | Good |
| 4 | 228 | 77 | 16.51 | 32 | High |
| 5 | 111 | 34 | 17.22 | 28 | Not Tested |
| 6 | 84 | 37 | 14.66 | 26.1 | Not Tested |
| 7 | 112 | 50 | 14.45 | 4.9 | Not Tested |
| 8 | 170 | 55 | 16.9 | 4.6 | Not Tested |
| 9 | 170 | 52 | 16.9 | 7 | Poor |
| 10 | 89 | 55 | 12.21 | 17 | Poor |
| 11 | 88 | 27 | 17.46 | 27 | Good |

Figure 5:
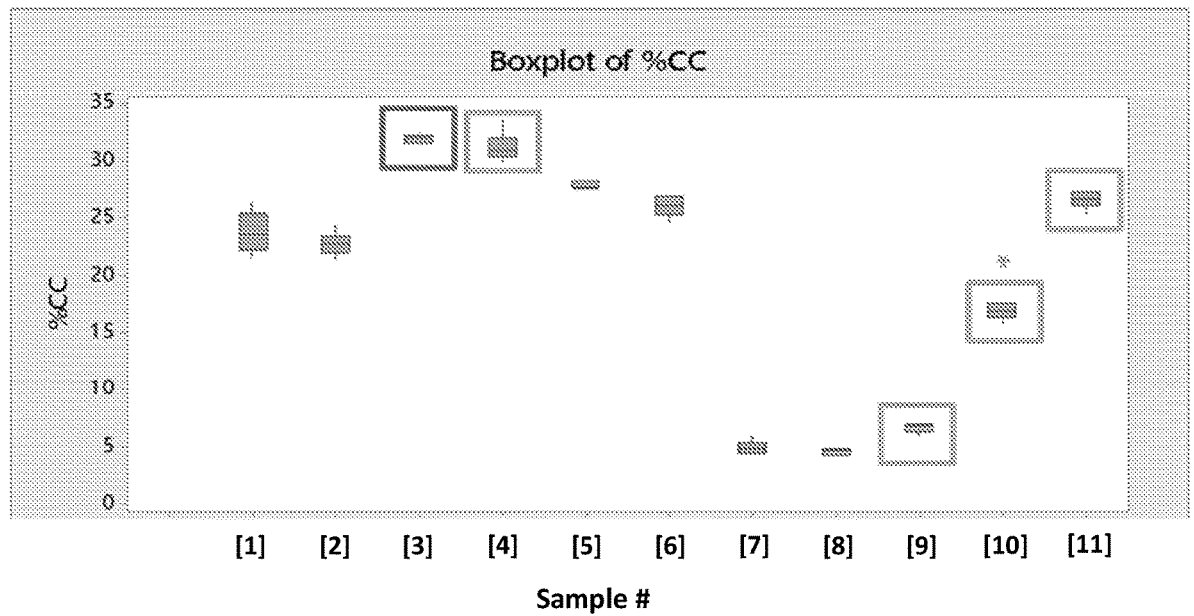
FIG. 5 is a graph illustrating the distribution of crimp contraction (CC) values across eleven (11) different stitching yarns.

In particular, infusion performance of the five (5) tested fabrics, i.e., samples #3, 4, 9, 10, and 11, was assessed. These fabrics were essentially the same (i.e., a non-crimp, unidirectional fabric formed from glass fibers (1240 Tex)) except for the use of a different stitching yarn. FIG. 5 is a boxplot 500 that shows the crimp contraction (CC) values for the stitching yarn used in each of the eleven (11) candidate fabrics. Additional information on the stitching yarns is presented in Table 1.

An IPIT test (in the x-direction), an IPIT test (in the y-direction), and a TTIS test were performed on each tested sample to assess its infusion performance. From this data, the IPIT(x) and TTIS test data were used as indicators of infusion performance. Sample #4 exhibited the best performance of the group; samples #3 and 11 exhibited satisfactory performance; and samples #9 and 10 exhibited poor performance.

Figure 6:
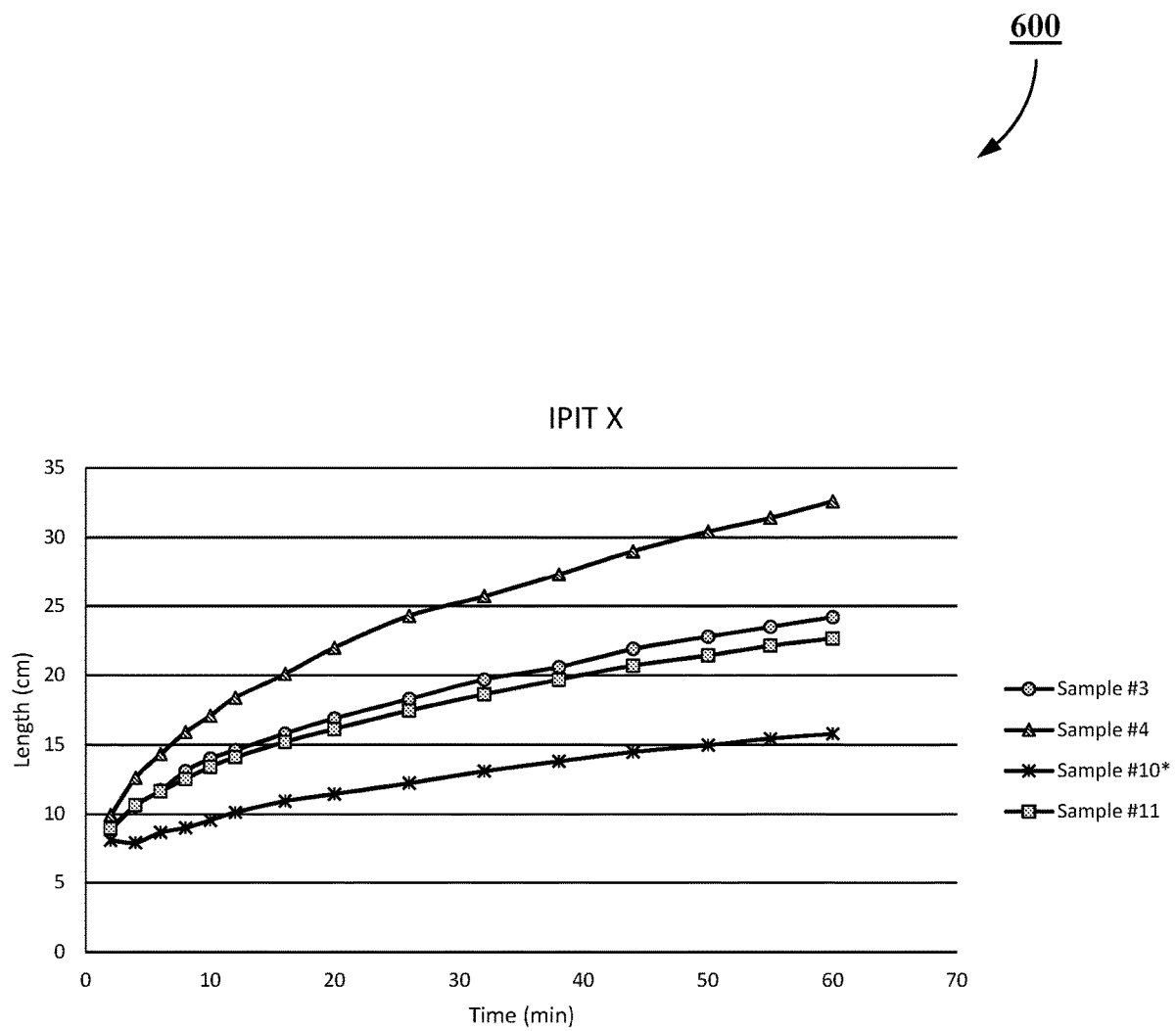
FIG. 6 is a graph illustrating the results of the IPIT test of FIG. 4 performed on three (3) different fabrics to measure the infusion rate (in the x-direction) of the fabrics.

FIG. 6 is a graph 600 that shows the results of the IPIT test 400 performed on samples #3, 4, 10, and 11 to measure the infusion rate (in the x-direction) of those fabrics.

Figure 7:
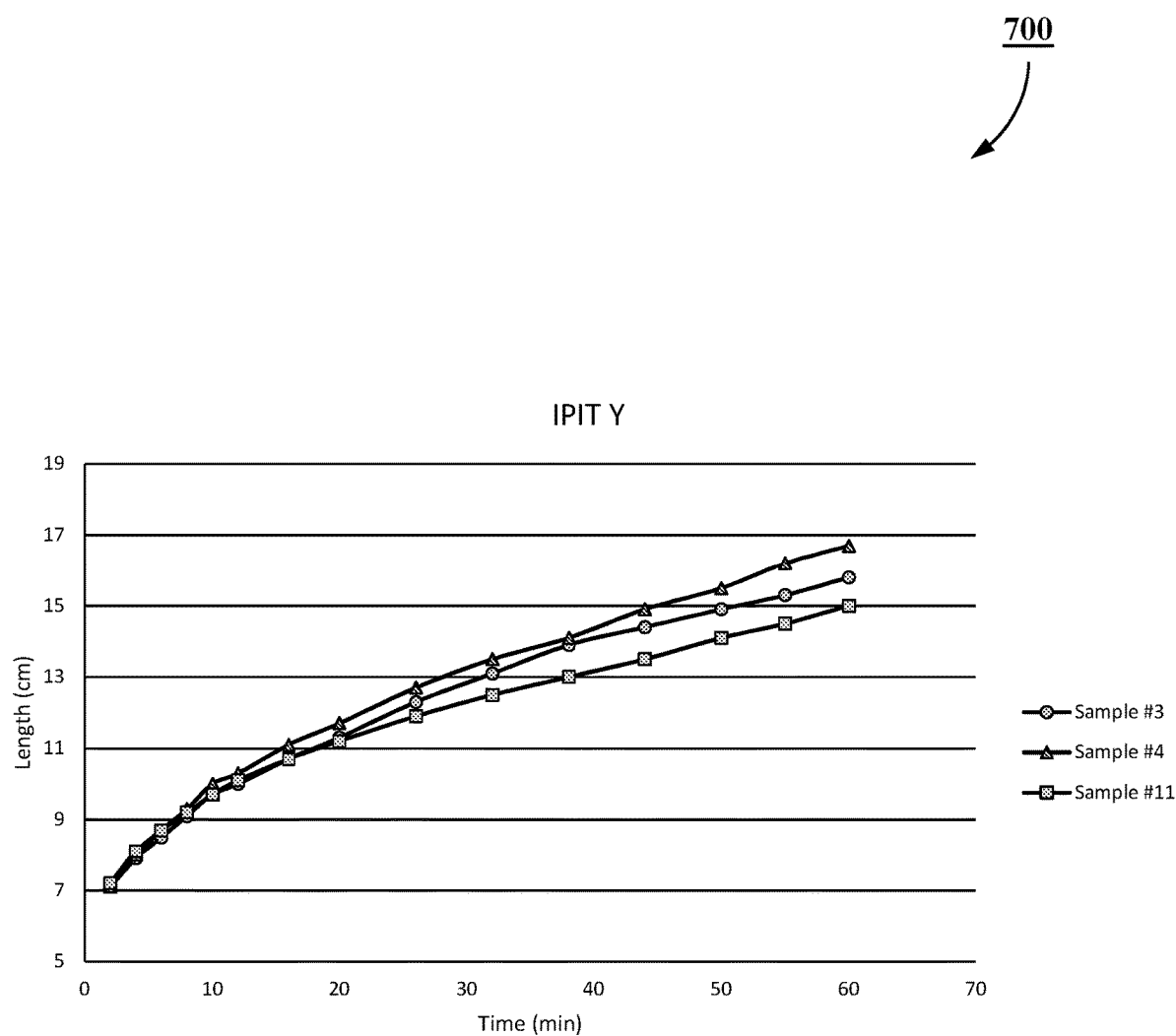
FIG. 7 is a graph illustrating the results of the IPIT test of FIG. 4 performed on three (3) different fabrics to measure the infusion rate (in the y-direction) of the fabrics.

FIG. 7 is a graph 700 that shows the results of the IPIT test 400 performed on samples #3, 4, and 11 to measure the infusion rate (in the y-direction) of those fabrics.

The results of the TTIS test 300 performed on samples #3, 4, and 11 to further assess the infusion rate of those fabrics are detailed in Table 2.

TABLE 2

| | Sample #3 | Sample #4 | Sample #11 |
| --- | --- | --- | --- |
| Area Weight (g/m²) | 1267 | 1281 | 1265 |
| Number of Layers | 35 | 35 | 35 |
| Resin Type | Epoxy | Epoxy | Epoxy |
| Time for First Spot of Resin (min) | 30 | 14 | 28 |

From the graphs 600 and 700, as well as Table 2, it is clear that (1) samples #3 and 11 exhibited a "good" rate of infusion; (2) samples #3 and 11 performed similar to one another; and (3) sample #4 outperformed both of these samples. Conversely, the IPIT test 400 and the TTIS test 300 revealed that samples #9 and 10 exhibited a "poor" rate of infusion, which is believed to be at least partially attributable to one or more properties of the stitching yarns used in those samples.

The reinforcing fabrics described herein (e.g., the reinforcement fabric 100) can be combined with a resin matrix, such as in a mold, to form a composite article. Any suitable resin system can be used. In some exemplary embodiments, the resin is a vinyl ester resin. In some exemplary embodiments, the resin is a polyester resin. In some exemplary embodiments, the resin is an epoxy resin. In some exemplary embodiments, the resin includes a viscosity modifier.

Any suitable composite forming process can be used, such as vacuum-assisted resin transfer molding (VARTM). The composite article is reinforced by the reinforcing fabric. In some exemplary embodiments, the composite article is a wind turbine blade or related component (e.g., spar cap).

The above description of specific embodiments has been given by way of example. From the disclosure given, those skilled in the art will not only understand the inventive concepts and their attendant advantages, but will also find apparent various changes and modifications to the structures and concepts disclosed. It is sought, therefore, to cover all such changes and modifications as fall within the spirit and scope of the general inventive concepts, as defined herein and by the appended claims, and equivalents thereof.

The invention claimed is:

1. A reinforcing fabric comprising:
a plurality of first fibers oriented in a first direction;
a plurality of second fibers oriented in a second direction; and
a stitching yarn maintaining the first fibers and the second fibers in their respective orientations,
wherein the second direction is different from the first direction;
wherein the stitching yarn has a linear density of at least 70 dTex;
wherein the stitching yarn has a first crimp contraction, prior to stitching, of at least 24%, and
wherein the stitching yarn has a second crimp contraction, after being unstitched from the fabric, with the second crimp contraction being reduced from the first crimp contraction by no more than 30%.

2. The reinforcing fabric of claim 1, wherein the first direction is 0 degrees, which corresponds to a lengthwise direction of the reinforcing fabric.

3. The reinforcing fabric of claim 1, wherein the second direction is within the range of greater than 0 degrees to less than or equal to 90 degrees.

4. The reinforcing fabric of claim 1, wherein the first fibers constitute between 91 wt. % and 99.5 wt. % of the fabric; and
wherein the second fibers constitute between 0.5 wt. % and 9 wt. % of the fabric.

5. The reinforcing fabric of claim 1, wherein at least some of the first fibers are glass fibers.

6. The reinforcing fabric of claim 1, wherein at least some of the second fibers are glass fibers.

7. The reinforcing fabric of claim 1, wherein at least some of the first fibers are carbon fibers.

8. The reinforcing fabric of claim 1, wherein at least some of the second fibers are carbon fibers.

9. The reinforcing fabric of claim 1, wherein the first fibers are glass fibers and the second fibers are glass fibers, and
wherein a glass composition of the first fibers differs from a glass composition of the second fibers.

10. The reinforcing fabric of claim 1, wherein the first fibers include at least two distinct types of fibers selected from the group consisting of glass fibers, basalt fibers, and carbon fibers.

11. The reinforcing fabric of claim 1, wherein the stitching yarn comprises a plurality of filaments, and
wherein the filaments have an average diameter of at least 12 μm.

12. The reinforcing fabric of claim 11, wherein a number of the filaments is within the range of 20 to 80.

13. The reinforcing fabric of claim 1, wherein the stitching yarn constitutes less than 3 wt. % of the fabric.

14. The reinforcing fabric of claim 1, wherein the stitching yarn is made of a natural or synthetic polymer.

15. The reinforcing fabric of claim 14, wherein the polymer is one of a polyester and a polyamide.

16. The reinforcing fabric of claim 1, wherein the stitching yarn has a linear mass density within the range of 70 dTex to 250 dTex.

17. The reinforcing fabric of claim 1, wherein the stitching yarn forms a stitching pattern through the fabric, the stitching pattern being selected from the group consisting of a tricot stitching pattern, a symmetric double tricot stitching pattern, an asymmetric double tricot stitching pattern, a symmetric diamant stitching pattern, and an asymmetric diamant stitching pattern.

18. The reinforcing fabric of claim 1, wherein the stitching yarn defines a stitching length within the range of 3 mm to 6 mm.

19. The reinforcing fabric of claim 1, wherein the stitching yarn is formed from two discrete strands.

20. The reinforcing fabric of claim 1, wherein the reinforcing fabric further comprises a plurality of third fibers oriented in a third direction,
wherein the second fibers are glass fibers and the third fibers are glass fibers, and
wherein a glass composition of the second fibers is the same as a glass composition of the third fibers.

* * * * *